(12) United States Patent
Nagaya et al.

(10) Patent No.: US 6,471,023 B2
(45) Date of Patent: Oct. 29, 2002

(54) ONE-WAY CLUTCH

(75) Inventors: Shuichi Nagaya, Hyogo (JP); Hiroo Kiko, Hyogo (JP); Masakazu Domoto, Shizuoka (JP)

(73) Assignees: Bando Chemical Industries, Ltd., Hyogo (JP); NTN Corporation, Osaka (JP)

( * ) Notice: Subject to any disclaimer, the term of this patent is extended or adjusted under 35 U.S.C. 154(b) by 36 days.

(21) Appl. No.: 09/739,694

(22) Filed: Dec. 20, 2000

(65) Prior Publication Data

US 2001/0006138 A1 Jul. 5, 2001

(30) Foreign Application Priority Data

Dec. 28, 1999 (JP) .......................................... 11-374292

(51) Int. Cl.⁷ .............................................. F16D 41/07
(52) U.S. Cl. .................................. 192/45.1; 192/110 B
(58) Field of Search .............................. 192/45.1, 41 A, 192/110 B

(56) References Cited

U.S. PATENT DOCUMENTS

| 2,423,178 A | * | 7/1947 | Dodge ........................ 192/45.1 |
| 3,006,447 A | * | 10/1961 | Irwin ......................... 192/45.1 |
| 3,022,875 A | * | 2/1962 | Davis ......................... 192/45.1 |
| 5,517,957 A | * | 5/1996 | Wagner et al. ............ 123/192.1 |
| 5,676,225 A | * | 10/1997 | Miyata ....................... 192/41 R |

FOREIGN PATENT DOCUMENTS

| JP | 61-228153 | 10/1986 |
| JP | 11-218144 A | * 8/1999 |

* cited by examiner

*Primary Examiner*—Richard M. Lorence
(74) *Attorney, Agent, or Firm*—Nixon Peabody LLP; Thomas W. Cole

(57) ABSTRACT

In a belt-driven auxiliary equipment driving apparatus for vehicle engines, a one-way clutch-integrated pulley is disposed which includes a bearing for relatively rotatably supporting inner and outer rings and a clutch mechanism for effecting or blocking torque transmission between the inner and outer rings by changing the tilting direction of sprags according to the direction of relative rotation of the inner and outer rings. In such a case, a cage of the clutch mechanism is connected to a cage of the bearing. The cage of the bearing is rotated in the same direction as that of relative rotation of the outer ring at a relative rotational speed lower than that of the outer ring, and as a result, the relative speed of bodily movement of each sprag around the inner ring is made slower than the relative rotational speed of the outer ring. During idling of the inner and outer rings, each sprag thereby slides also on the outer ring and the speed of slide of each sprag on the inner ring is lowered. This avoids abrasion from progressing only in the cam surface of each sprag in contact with the inner ring, thereby improving functional durability of the clutch.

4 Claims, 11 Drawing Sheets

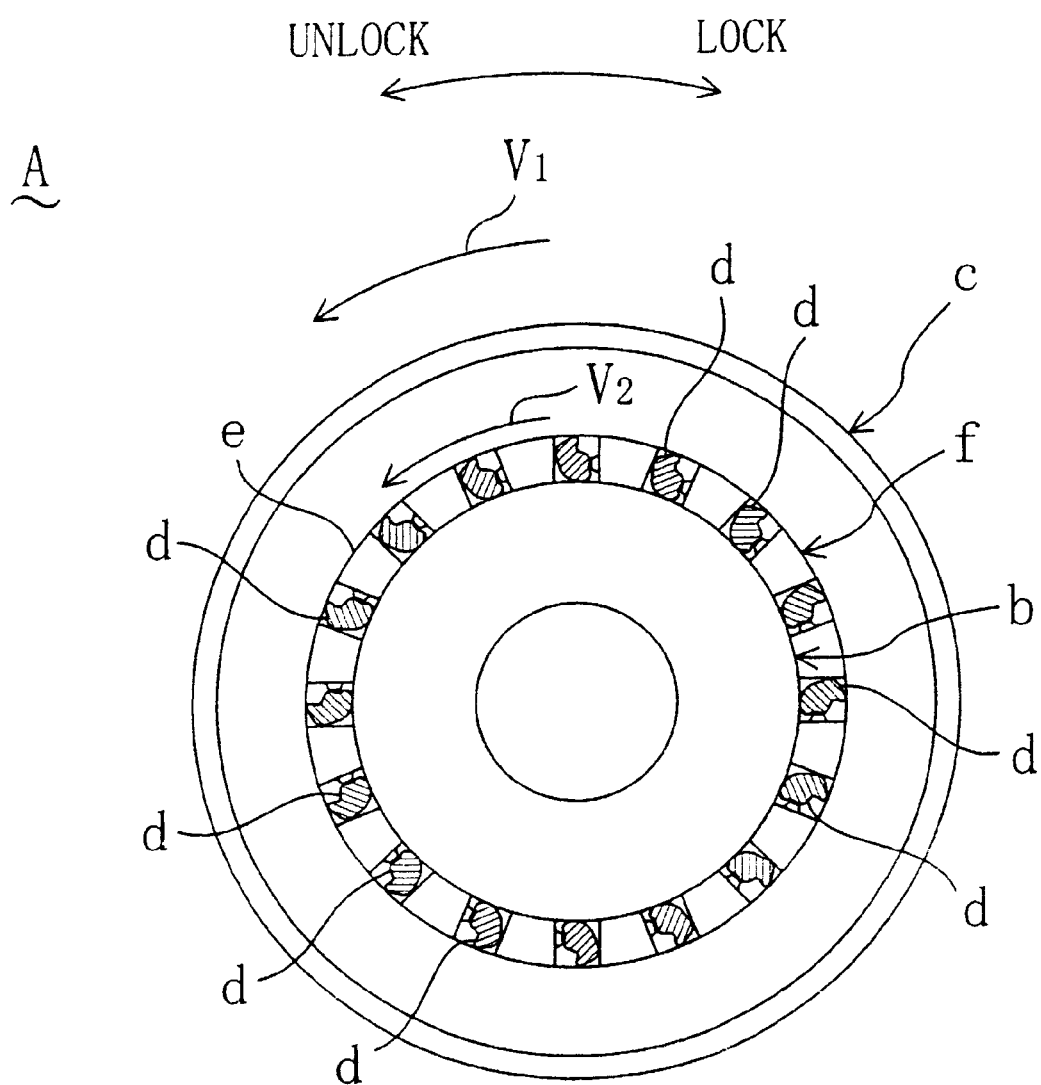

ONE-WAY CLUTCH

FIELD OF THE INVENTION

This invention relates to a one-way clutch for effecting or blocking torque transmission between inner and outer rings by rocking motion of cam members according to a direction of relative rotation of the inner and outer rings, and more particularly relates to measures for reducing the speed at which the cam members slide on the inner ring.

DESCRIPTION OF THE PRIOR ART

As for example disclosed in Japanese Unexamined Patent Publication No. 61-228153, it is known that in an auxiliary equipment driving apparatus for transmitting torque of a crank shaft of a vehicle engine to a rotor of auxiliary equipment through a power transmission belt, a one-way clutch is disposed in a torque transmission path of the auxiliary equipment driving apparatus to absorb slight variations in angular velocity of torque, resulting from an explosion stroke of the engine, thereby reducing a load of the power transmission belt. Specifically, the one-way clutch operates to effect transmission of torque of the crank shaft to the rotor of the auxiliary equipment for a period of increase in angular velocity of the crank shaft during slight variations in angular velocity thereof, and block transmission of inertial torque of the rotor to the crank shaft for a period of decrease in angular velocity of the crank shaft during slight variations in angular velocity thereof. In particular, if the auxiliary equipment is an alternator, its rotor has large inertial torque and therefore the effect of reducing a belt load is significant.

Now, description will be made about a conventional one-way clutch with reference to exemplary one-way clutch-integrated pulleys each formed by building a one-way clutch into a pulley. Such one-way clutch-integrated pulleys include two known types: a first type of relatively rotatably supporting inner and outer rings b, c to a single bearing a as shown in FIG. 13; and a second type of relatively rotatably supporting inner and outer rings b, c to axially juxtaposed two bearings a, a as shown in FIG. 14. In either type, the bearing a is juxtaposed with a clutch mechanism f formed by retaining a plurality of sprags d, d, . . . as cam members in a cage e to allow their tilting motion therein.

For the period of increase in angular velocity of the crank shaft during slight variations in angular velocity thereof, when the outer ring c relatively rotates in its locking direction (clockwise in FIG. 15), each sprag d of the clutch mechanism f tilts clockwise in FIG. 15 to wedge between the inner and outer rings b, c, thereby effecting torque transmission between the inner and outer rings b, c. On the other hand, for the period of decrease in angular velocity of the crank shaft during slight variations in angular velocity thereof, when the outer ring c relatively rotates in its unlocking direction (counterclockwise in FIG. 15), each sprag d tilts opposite to the direction to wedge between the rings, i.e., counterclockwise in FIG. 15, to slide on the inner and outer rings b, c so that the inner and outer rings b, c idle, thereby blocking torque transmission between the inner and outer rings b, c. To implement such behaviors, surfaces of each sprag d in contact with cam surfaces of the inner and outer rings b, c are formed into cam surfaces so as to change the tilting direction of the sprag d depending upon the direction of relative rotation of the inner and outer rings b, c.

In such a conventional one-way clutch using sprags as cam members, however, the actual sprags d, d, . . . do not produce equal sliding motions between the inner and outer rings b, c during idling (relative rotation in the unlocking direction) of the inner and outer rings b, c. More specifically, when the speed of relative rotation of the outer ring c with respect to the inner ring b is indicated by V1 and the speed of relative bodily movement of each sprag d around the inner ring b is indicated by V2, the relationship of V1=V2 is established. Accordingly, each sprag d slides only on the inner ring b which is a member with small resistance to torque.

Therefore, under service conditions of a large number of idlingmovements, for example, in sucha case as used in an auxiliary equipment driving apparatus for vehicle engines which frequently perform quick speed-up and speed-down running within the high engine speed range, abrasion is caused excessively on the cam surface of each sprag d in contact with the inner ring b over the other portions thereof. Therefore, abrasion is also likely to progress on the cam surface of the inner ring b. As a result of these phenomena, functional durability of the clutch will be readily deteriorated.

A principal object of the present invention is, in a one-way clutch for connecting and disconnecting torque transmission between inner and outer rings by rocking cam members in a clutch mechanism when the inner and outer rings relatively rotates via a bearing, to obviate excessive abrasion only on the cam surface of each cam member in contact with the cam surface of the inner ring and progressive abrasion on the cam surface of the inner ring by sliding each cam member also on the outer ring and reducing the speed of slid of each cam member on the inner ring during idling of the inner and outer rings, with the use of rotational movement of a cage of the bearing, resulting in improved functional durability of the clutch.

SUMMARY OF THE INVENTION

To attain the above object, the inventors direct their attention to the bearing cage relatively rotating in the same direction as that of relative rotation of the outer ring at a lower relative rotational speed than that of the outer ring, and aim at sliding each cam member also on the outer ring to reduce the speed of slide of each cam member on the inner ring by connecting the cage of the bearing to the cage of the clutch mechanism to make the speed of relative bodily movement of each cam member around the inner ring slower than the relative rotational speed of the outer ring.

More specifically, the present invention is directed to a one-way clutch comprising: an inner ring; an outer ring which is coaxially disposed around the inner ring and relatively rotatably assembled with the inner ring; a bearing having a plurality of rolling elements arranged for rolling motion between the inner and outer rings in a plane orthogonal to a rotational axis of the inner and outer rings and a cage, disposed between the inner and outer rings for rotation around the rotational axis of the inner and outer rings, for retaining the plurality of rolling elements to allow their rolling motion, the bearing relatively rotatably supporting the inner and outer rings so that the plurality of rolling elements roll to rotate the cage in the same direction as that of relative rotation of the outer ring at a lower relative rotational speed than that of the outer ring; and a clutch mechanism having a plurality of cam members arranged for rocking motion between the inner and outer rings in a plane orthogonal to the rotational axis of the inner and outer rings but different from the plane in which the rolling elements of the bearing are arranged and a cage, disposed between the inner and outer rings for rotation around the rotational axis of the inner and outer rings, for retaining the plurality of cam members to allow their rocking motion, the clutch mechanism effecting torque transmission between the inner and outer rings by tilting motion of the plurality of cam members in a direction to wedge between the inner and outer rings during relative rotation of the inner and outer rings in their locking direction and blocking the torque transmission by tilting motion of the plurality of cam members opposite to the direction to wedge between the inner and outer rings during relative rotation of the inner and outer rings in their unlocking direction.

Further, the cage of the clutch mechanism is connected in unitarily rotating relation with the cage of the bearing.

With the above construction, the inner and outer rings of the one-way clutch are relatively rotatably supported to the bearing with the rolling elements of the bearing retained for rolling motion by the cage between the inner and outer rings. When torque is input into the one-way clutch so that the inner and outer rings are relatively rotated, each cam member of the clutch mechanism rocks in normal or reverse directions depending upon the direction of relative rotation of the inner and outer rings to effect or block torque transmission between the inner and outer rings. In other words, during relative rotation of the inner and outer rings in the locking direction, each cam member tilts in a direction to wedge between the inner and outer rings to effect torque transmission therebetween. In contrast, during relative rotation of the inner and outer rings in the unlocking direction, each cam member tilts opposite to the direction to wedge between the inner and outer rings to idle them thereby blocking the torque transmission therebetween.

When each cam member tilts opposite to the direction to wedge between both the rings during relative rotation of both the rings in the unlocking direction, the relative rotation of both the rings creates resistance against torque between each cam member and the inner ring and between each cam member and the outer ring. In such a case, since the resistance against torque created between each cam member and the inner ring is smaller than that created between each cam member and the outer ring, each cam member may tend to slide only on the inner ring, i.e., bodily move around the inner ring at substantially the same speed as the relative rotational speed of the outer ring.

With this construction, however, the rolling elements of the bearing roll to rotate the cage of the bearing in the same direction as that of relative rotation of the outer ring at a relative rotational speed lower than that of the outer ring. Therefore, each cam member in the clutch mechanism is forced by the cage of the clutch mechanism to bodily move around the outer ring opposite to the direction of relative rotation of the outer ring, i.e., in a direction to reduce the relative rotational speed of the outer ring. As a result, each cam member slides also on the outer ring and the speed of slide of each cam member on the inner ring is reduced. Therefore, Instead of abrasion of each cam member due to slide only on the inner ring, each cam member abrades due to slide on both the inner and outer rings. This obviates excessive abrasion of each cam member in its cam surface in contact with the inner ring during idling of the inner and outer rings and ease of progressive abrasion of the cam surf ace of the inner ring, thereby improving functional durability of the clutch.

In the above construction, the one-way clutch may include a pair of bearings, the pair of bearings may be arranged on both axially lateral sides of the clutch mechanism, respectively, and the cage of the clutch mechanism may be connected in unitarily rotating relation with at least one of the cages of both the bearings.

With this structure, during relative rotation of the inner and outer rings in the unlocking direction, the cage of the clutch mechanism rotates unitarily with at least one of the cages of both the bearings. Accordingly, the same effects and operations can be attained.

The one-way clutch may be disposed in a torque transmission path for transmitting torque of a crank shaft rotating with slight variations in angular velocity resulting from an explosion stroke of a vehicle engine to an input shaft of auxiliary equipment through a power transmission belt.

With this structure, the crank shaft of the vehicle engine rotates with slight variations in angular velocity resulting from the explosion stroke of the engine. For a period of increase in angular velocity of the crank shaft during slight variations in angular velocity thereof, the one-way clutch transmits torque of the crank shaft to the input shaft of the auxiliary equipment. On the other hand, for a period of decrease in angular velocity of the crank shaft during slight variations in angular velocity thereof, the one-way clutch blocks torque transmission between the crank shaft and the auxiliary equipment to avoid inertial torque of the rotor of the auxiliary equipment from being transmitted to the crank shaft.

In the above structure, the inner ring is preferably connected to either the crank shaft of the vehicle engine or the input shaft of the auxiliary equipment, and the outer ring is preferably provided in unitarily rotating relation with a pulley section for training the power transmission belt therearound.

With this structure, the pulley section for training the power transmission belt therearound is provided around the outer periphery of the outer ring of the one-way clutch, thereby forming a one-way clutch-integrated pulley. Therefore, when the one-way clutch-integrated pulley is carried on, for example, the input shaft of the auxiliary equipment, a torque transmission path is established between the crank shaft of the engine and the input shaft of the auxiliary equipment through the power transmission belt. Accordingly, the above effects and operations can be well achieved.

BRIEF DESCRIPTION OF THE DRAWINGS

FIG. 15 is a view which shows a relative speed of bodily movement of each sprag around an inner ring during idling of inner and outer rings by comparison with a relative rotational speed of the outer ring and corresponds to FIG. 4.

DESCRIPTION OF THE PREFERRED EMBODIMENTS

Hereinafter, preferred embodiments of the present invention will be described with reference to the drawings.

(Embodiment 1)

Figure 5:
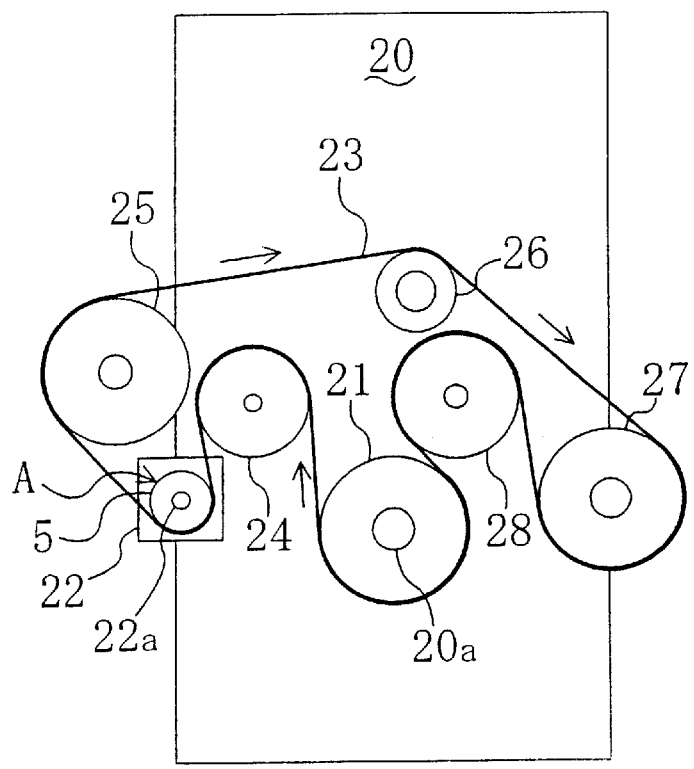
FIG. 5 is a diagram schematically showing a serpentine belt-driven auxiliary equipment driving apparatus for a vehicle engine.

FIG. 5 schematically shows the layout of a belt-driven type auxiliary equipment driving apparatus for vehicle engines, in which a one-way clutch-integrated pulley A according to Embodiment 1 of the present invention is disposed. This auxiliary equipment driving apparatus is disposed at one end of a four-cylinder four-stroke-cycle engine 20 mounted on an automotive vehicle. In detail, the auxiliary equipment driving apparatus includes a drive pulley 21 mounted on a crank shaft 20a rotating together with slight variations in angular velocity due to an explosion stroke of the engine 20, and a plurality of driven pulleys mounted on input shafts of a plurality of auxiliary equipment including an alternator 22, respectively. A single V-ribbed belt 23 as a power transmission belt is trained, in a serpentine form or in a so-called serpentine layout, around these pulleys.

More specifically, the drive pulley 21, a tension pulley 24 of an automatic belt tensioner, a pulley 25 for a hydraulic pump of a power steering, an idler pulley 26, a pulley 27 for a compressor of an air conditioner, and a pulley 28 for an engine-cooling fan are arranged in the order of such a running direction of the V-ribbed belt 23 as shown in arrows in FIG. 5. In addition, the one-way clutch-integrated pulley A is disposed between the tension pulley 24 and the pulley 25 for a hydraulic pump, and is mounted on an alternator shaft 22a of the alternator 22 with a rotor having relatively large inertial torque.

Figure 1:
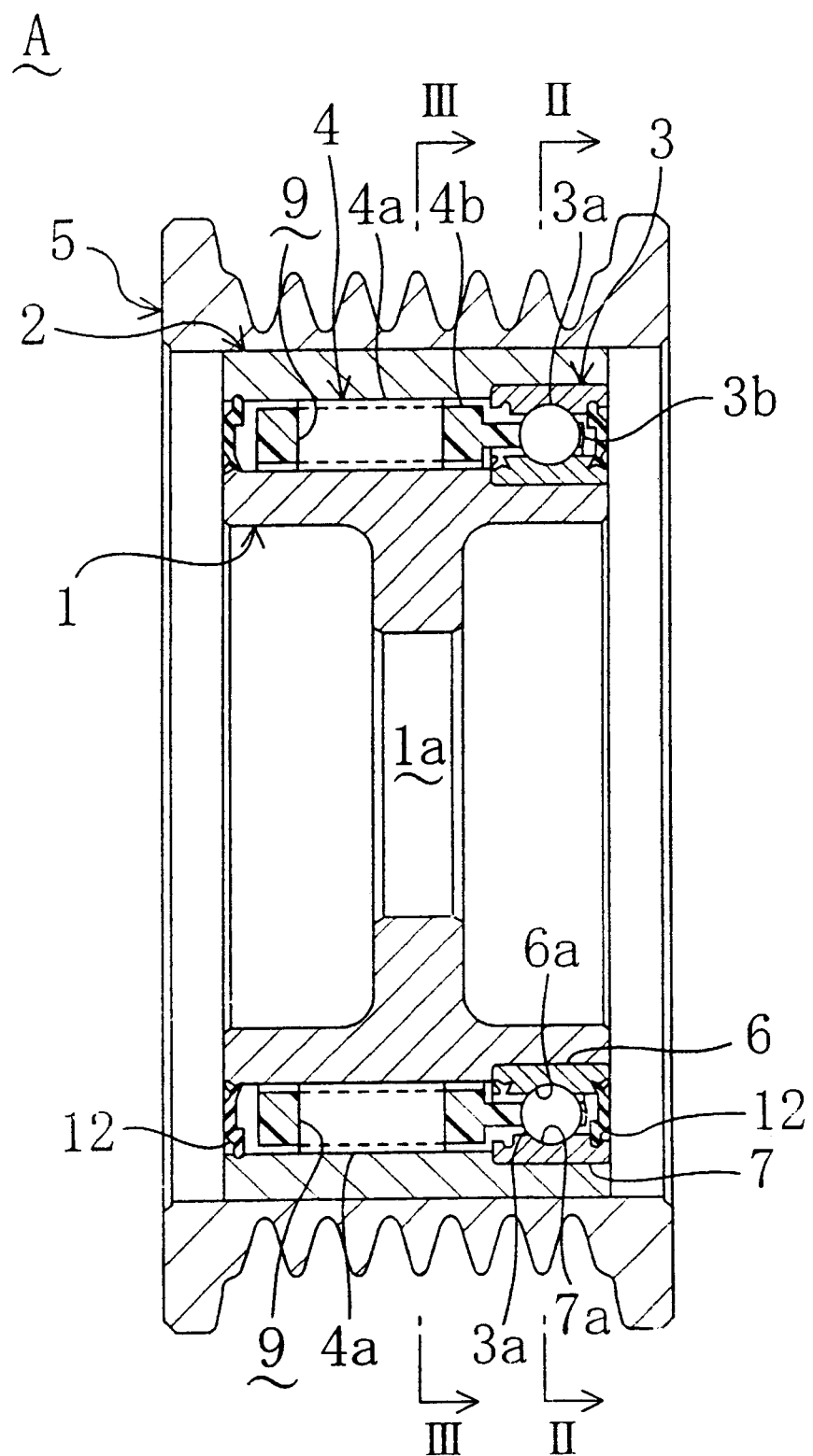
FIG. 1 is a longitudinal cross-sectional view showing the entire structure of a one-way clutch-integrated pulley according to Embodiment 1 of the present invention.
Figure 2:
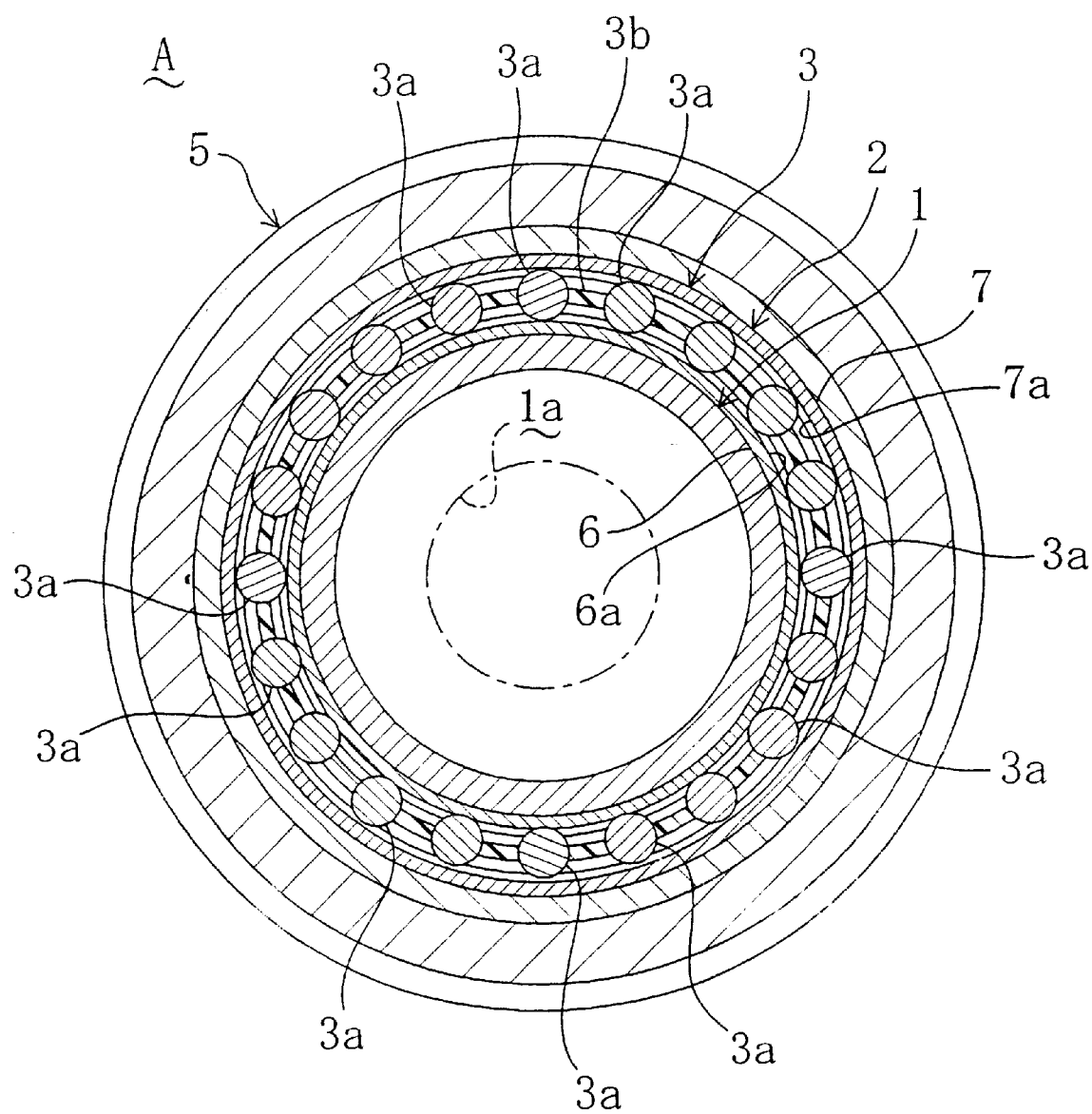
FIG. 2 is a cross-sectional view taken along the line II—II of FIG. 1.
Figure 3:
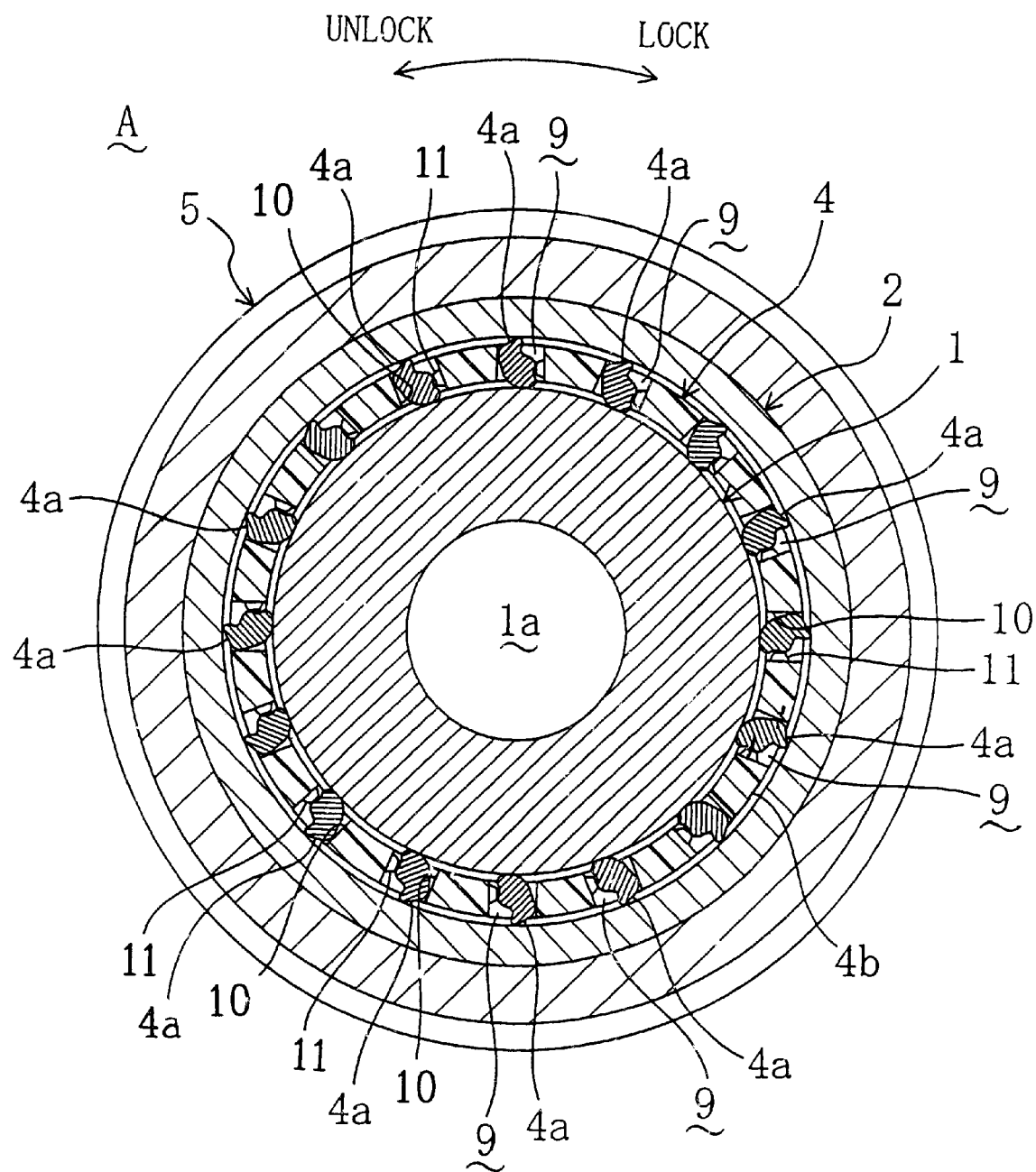
FIG. 3 is a cross-sectional view taken along the line III—III of FIG. 1.

As shown in FIGS. 1 through 3, the one-way clutch-integrated pulley A includes an inner ring 1 connected to the alternator shaft 22a and an outer ring 2 coaxially disposed around the outer periphery of the inner ring 1 and assembled for relative rotation with the inner ring 1. The inner and outer rings 1, 2 are relatively rotatably supported to a single-row deep-groove ball bearing 3 having a plurality of steel balls 3a, 3a, . . . as rolling elements arranged between the inner and outer rings 1, 2 in a single plane orthogonal to the axis of rotation of these rings 1, 2. Torque transmission between the inner and outer rings 1, 2 are effected or blocked by a clutch mechanism 4 according to the direction of relative rotation of the inner and outer rings 1, 2.

In the axial center of the inner ring 1, a mounting hole 1a is provided for connecting the inner ring 1 to the alternator shaft 22a. Around the outer periphery of the outer ring 2, a pulley section 5 is provided for training the V-ribbed belt 23 therearound.

As is also shown in FIG. 2, the deep groove ball bearing 3 includes: an inner ring 6 fixedly fitted onto the outer periphery of the inner ring 1 to unitarily rotate with the inner ring 1; and an outer ring 7 opposed around the outer periphery of the inner ring 6 in coaxial relation with each other and fixedly fitted into the inner periphery of the outer ring 2 to unitarily rotate with the outer ring 2. The outer periphery of the bearing inner ring 6 and the inner periphery of the bearing outer ring 7 are formed throughout the peripheries with deep grooves 6a, 7a of arcuate cross section for guiding the steel balls 3a, 3a, . . . to allow for their rolling motion, respectively. In addition, a ring-like cage 3b is coaxially disposed between the bearing inner and outer rings 6, 7. The cage 3b retains the steel balls 3a, 3a, . . . at regular pitches to allow for their rolling motion therein. The steel balls 3a, 3a, . . . roll to rotate the cage 3b in the same direction as that of relative rotation of the outer ring 2 at a relative rotational speed lower than that of the outer ring 2. In this manner, the inner and outer rings 1, 2 are relatively rotatably supported to the bearing 3.

As is also shown in FIG. 3, the clutch mechanism 4 includes a plurality of sprags 4a, 4a, . . . as cam members which are arranged for rocking motion in a single plane orthogonal to the rotational axis of the inner and outer rings 1, 2 but different from the plane in which the steel balls 3a, 3a, . . . of the deep groove ball bearing 3 are arranged. Further, a ring-like cage 4b is coaxially disposed between the inner and outer rings 1, 2. In the cage 4b, a plurality of retaining holes 9, 9, . . . of rectangular cross section cut through the cage 4b in its radial direction are arranged at predetermined circumferential pitches. The retaining holes 9, 9, . . . accommodate the respective sprags 4a, 4a, . . . to allow for their rocking motion.

Out of a pair of circumferentially opposed inner wall surfaces of each retaining hole 9, the inner wall surface located on the counterclockwise side in FIG. 3 serves as a riding land 10 on which the sprag 4a during rocking motion is slidably guided. On the other hand, each of the other inner wall surfaces located on the clockwise side in FIG. 3 is provided with a leaf spring 11. The leaf spring 11 presses the sprag 4a against the riding land 10. The point of contact of each sprag 4a with the riding land 10 is located radially outwardly of the point at which each sprag 4a receives a pressing force of the leaf spring 11. Each sprag 4a is thereby normally urged to tilt in a direction to wedge between the inner and outer rings 1, 2 (clockwise direction in FIG. 3).

Each sprag 4a has contact surfaces, serving as cam surfaces, on which it contacts with the outer periphery (cam surface) of the inner ring 1 and the inner periphery (cam surface) of the outer ring 2, respectively, and thereby tilts according to the direction of relative rotation of the outer ring 2. Specifically, when the outer ring 2 relatively rotates in the locking direction (clockwise direction in FIG. 3), the sprags 4a each tilt clockwise to wedge between the inner and outer rings 1, 2 thereby effecting torque transmission between the rings 1, 2. On the other hand, when the outer ring 2 relatively rotates in the unlocking direction (counterclockwise direction in FIG. 3), the sprags 4a each tilt counterclockwise to slid on the inner and outer rings 1, 2 thereby blocking torque transmission between the rings 1, 2.

Further, at both axial ends of the inner and outer rings 1, 2, respective ring-like seals 12, 12 are provided for sealing a space between the inner and outer rings 1, 2 from the outside. In detail, the seal 12 closer to the deep groove ball bearing 3 (on the right-hand side in FIG. 1) is disposed at the right end of the deep groove ball bearing 3 between the inner and outer rings 6, 7. The outer peripheral edge of the seal 12 is fixedly fitted into the inner periphery of the bearing outer ring 7, while the inner peripheral edge thereof slidably contacts with the outer periphery of the bearing inner ring 6. On the other hand, the other seal 12 closer to the clutch mechanism 4 (on the left-hand side in FIG. 1) is fixedly fitted at its outer peripheral edge into the inner periphery of the outer ring 2 and slidably contacts at its inner peripheral edge with the outer periphery of the inner ring 1.

Furthermore, in the present embodiment, the cage 4b of the clutch mechanism 4 is connected in unitarily rotating relation with the cage 3b of the deep groove ball bearing 3, as shown in FIG. 1.

Now, the operation of the one-way clutch-integrated pulley A having the foregoing construction will be described. The inner and outer rings 1, 2 of the one-way clutch-integrated pulley A are relatively rotatably supported to the deep groove ball bearing 3 by rolling motion of each steel ball 3a of the bearing 3. When torque of the crank shaft 20a of the vehicle engine 20 is input to the one-way clutch-integrated pulley A through the V-ribbed belt 23, the outer ring 2 rotates. During the time, the direction of relative rotation of the outer ring 2 changes with slight variations in angular velocity of the torque. Specifically, for the period of increase in angular velocity during slight variations in angular velocity of the torque, the outer ring 2 relatively rotates in the locking direction. On the other hand, for the period of decrease in angular velocity during the slight variations in angular velocity of the torque, the outer ring 2 relatively rotates in the unlocking direction. Further, in the clutch mechanism 4, for the period of relative rotation of the outer ring 2 in the locking direction, the sprags 4a, 4a, . . . are tilted in the direction to wedge between the inner and outer rings 1, 2 by relative rotation of the outer ring 2, thereby effecting torque transmitting between the inner and outer rings 1, 2. On the other hand, for the period of relative rotation of the outer ring 2 in the unlocking direction, the sprags 4a, 4a, . . . are tilted opposite to the direction to wedge between the rings 1, 2 by relative rotation of the outer ring 2, thereby blocking torque transmission between the rings 1, 2.

When the outer ring 2 relatively rotates in the unlocking direction (i.e., when the inner and outer rings 1, 2 idle), resistance against torque is created between each sprag 4a and the inner ring 1 and between each sprag 4a and the outer ring 2. In such a case, since the resistance against torque created between each sprag 4a and the inner ring 1 is smaller than that created between each sprag 4a and the outer ring 2, each sprag 4a may actually tend to slide only on the inner ring 1, i.e., bodily move around the inner ring 1 at substantially the same speed as the relative rotational speed of the outer ring 2, as already described in "Description of the Prior Art" of this specification.

In this embodiment, however, the steel balls 3a of the deep groove ball bearing 3 roll to rotate the cage 3b of the bearing 3 in the same direction as that of relative rotation of the outer ring 2 at a relative rotational speed lower than that of the outer ring 2. Therefore, each sprag 4a in the clutch mechanism 4 is forced by the cage 4b of the clutch mechanism 4 to bodily move around the outer ring 2 in a direction to reduce the relative rotational speed of the outer ring 2. As a result, each sprag 4a slides also on the outer ring 2 and the speed of slide of each sprag 4a on the inner ring 1 is reduced.

Therefore, instead of abrasion of each sprag 4a due to slide only on the inner ring 1, each sprag 4a abrades due to slide on both the inner and outer rings 1, 2.

The slide abrasion of the cam surface of each sprag 4a will be described in further detail. First, principal factors responsible to the slide abrasion are the speed of slide of the cam surface on a corresponding member, the contact pressure of the cam surface and the ambient temperature. In general, the following relationship is established among these factors:

(Slide abrasion)=(Speed of slide)×(Contact pressure)×(Ambient temperature)

Further, in the deep groove ball bearing 3 when the outer ring 2 of the one-way clutch-integrated pulley A relatively rotates in the unlocking direction, the following relationship is established between the relative rotational speed V1 of the outer ring 2 and the relative rotational speed V3 of the cage 3b:

$$V1 > V3 \tag{1}$$

In this case, the relative rotational speed of the cage 4b of the clutch mechanism 4, i.e., the relative speed V2 of bodily movement of each sprag 4a around the inner ring 1, is expressed as follows:

$$V2 = V3 \tag{2}$$

Figure 4:
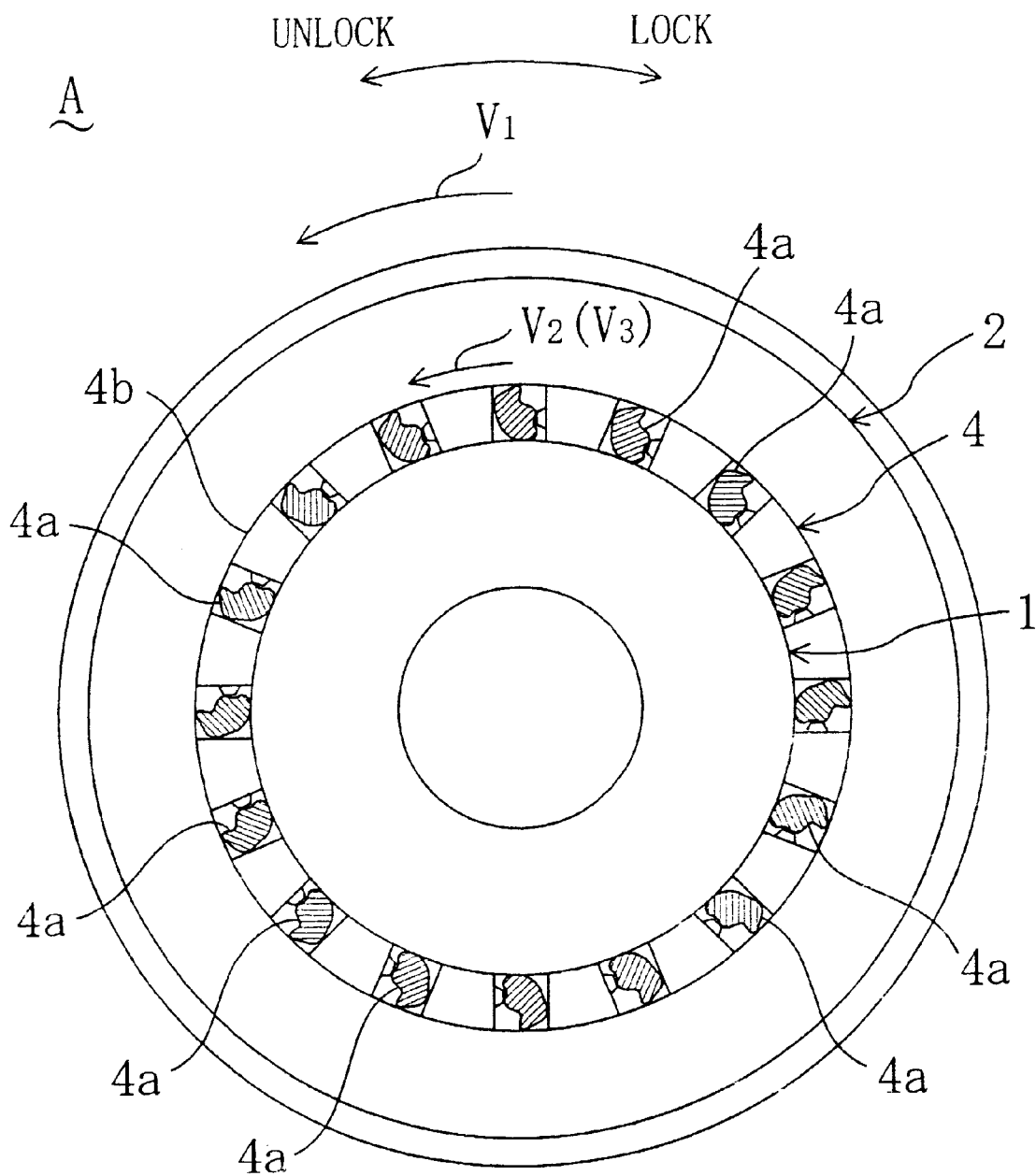
FIG. 4 is a schematic view showing a relative speed of bodily movement of each sprag around an inner ring during idling of inner and outer rings by comparison with a relative rotational speed of the outer ring.

Based on the above formulae (1) and (2), the following relationship is established, as schematically shown in FIG. 4, between the relative rotational speed V1 of the outer ring 2 and the relative speed V2 of bodily movement of each sprag 4a in the clutch mechanism 4:

$$V1 > V2 \tag{3}$$

From the above, it can be understood that when the one-way clutch-integrated pulley A is in idling condition, the cam surface of each sprag 4a in contact with the inner ring 1 is less abraded corresponding to decrease in the speed of slide. More specifically, the speed of slide of each sprag 4a on the inner ring 1, namely, the relative speed V2 of bodily movement of each sprag 4a around the inner ring 1, is generally approximately one half of the relative rotational speed V1 of the outer ring 2, i.e., V2=(½)·V1, though it varies with the rotational speed of the cage or the like depending upon the type of bearing or the like. Accordingly, the abrasion of each sprag 4a is reduced by half for the inner spring 1.

In this embodiment as described so far, in the one-way clutch-integrated pulley A which includes the single deep groove ball bearing 3, provided in the torque transmission path through which torque of the crank shaft 20a rotating with slight variations in angular velocity due to an explosion stroke of the vehicle engine 20 is transmitted to the plurality of input shafts of auxiliary equipment via the single V-ribbed belt 23 of serpentine layout, for relatively rotatably supporting the inner and outer rings 1, 2, and the clutch mechanism 4 for effecting or blocking torque transmission between the inner and outer rings 1, 2 according to the direction of relative rotation between the inner and outer rings 1, 2, the cage 4b of the clutch mechanism 4 is connected to the cage 3b of the deep groove ball bearing 3 so as to slide each sprag 4a also on the outer ring 2 and reduce the speed of slide of each sprag 4a on the inner ring 1. This obviates excessive abrasion of each sprag 4a in its cam surface in contact with the inner ring 1 during idling of the inner and outer rings 1, 2 and ease of progressive abrasion of the cam surface of the inner ring 1, thereby improving functional durability of the clutch.

Figure 6:
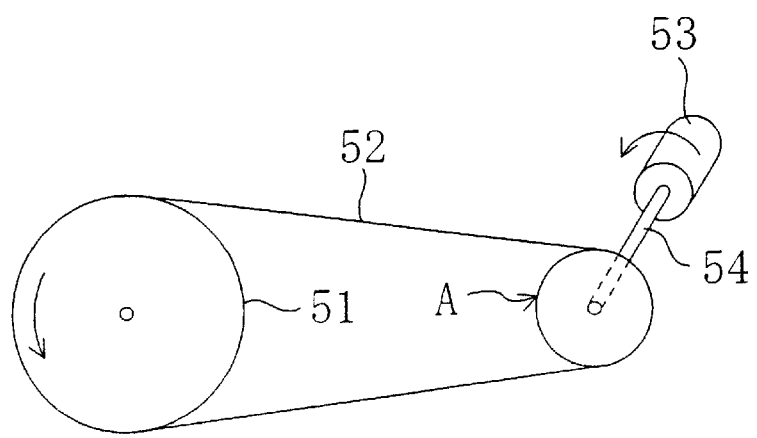
FIG. 6 is an explanatory diagram showing the layout of an abrasion test in which quick speed-up and speed-down running is performed in Examination 1.
Figure 7:
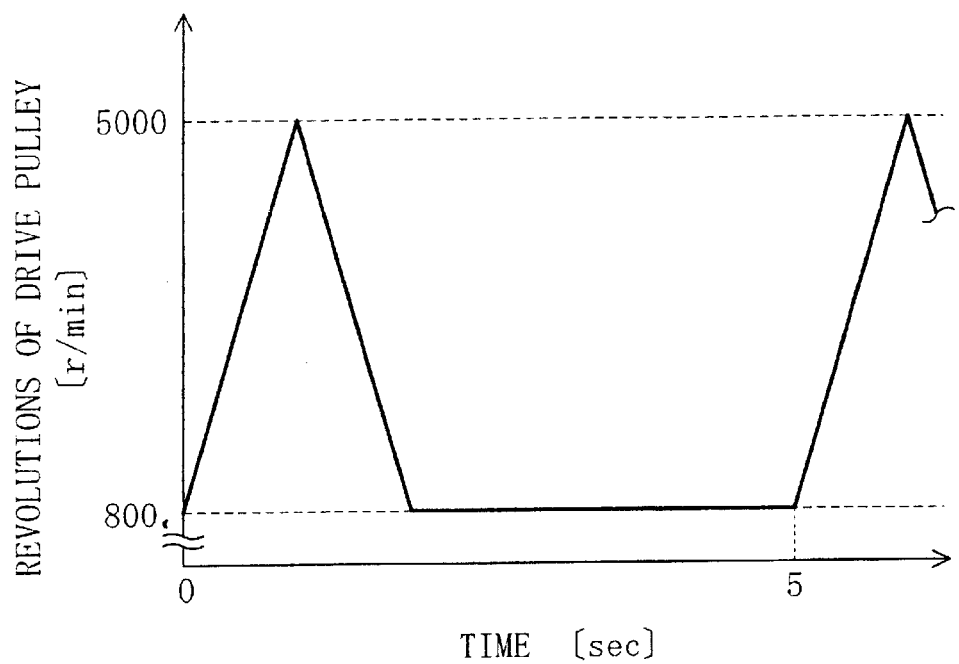
FIG. 7 is a plot showing operational conditions of a drive pulley in Examination 1.

Next, description will be made about two experiments to measure the amount of abrasion of each sprag with the use of the one-way clutch-integrated pulley A having the structure of Embodiment 1. In Experiment 1, as schematically shown in FIG. 6, a V-ribbed belt 52 was trained between a drive pulley 51 of a V-ribbed pulley and the one-way clutch-integrated pulley A having the structure of Embodiment 1 (hereinafter, also referred to as an inventive example), the drive pulley 51 in this arrangement was rotated to subject the one-way clutch-integrated pulley A to quick speed-up and speed-down running for a predetermined time period, and the amount of abrasion (unit: $\mu$m) of each sprag was then measured. More specifically, a rotor 53 having predetermined inertial torque was connected in unitarily rotating relation with the inner ring of the one-way clutch-integrated pulley A via a shaft member 54. Further, the one-way clutch-integrated pulley A was urged by a constant force in a direction away from the drive pulley 51 so that a predetermined tension was applied to the V-ribbed belt 52. In this arrangement, as shown in FIG. 7, the rotational speed of the drive pulley 51 was quickly raised to 5000 rpm at intervals of 5 seconds while rotating the drive pulley 51, basically, at 800 rpm.

As a comparative example, there was prepared a conventional one-way clutch-integrated pulley, namely, a pulley in which the cage of the clutch mechanism is separate from the cage of the deep groove ball bearing. The comparative example was also experimented in the same conditions as applied in the inventive example. The results of the experiment on both the examples are together shown in FIG. 8.

Figure 8:
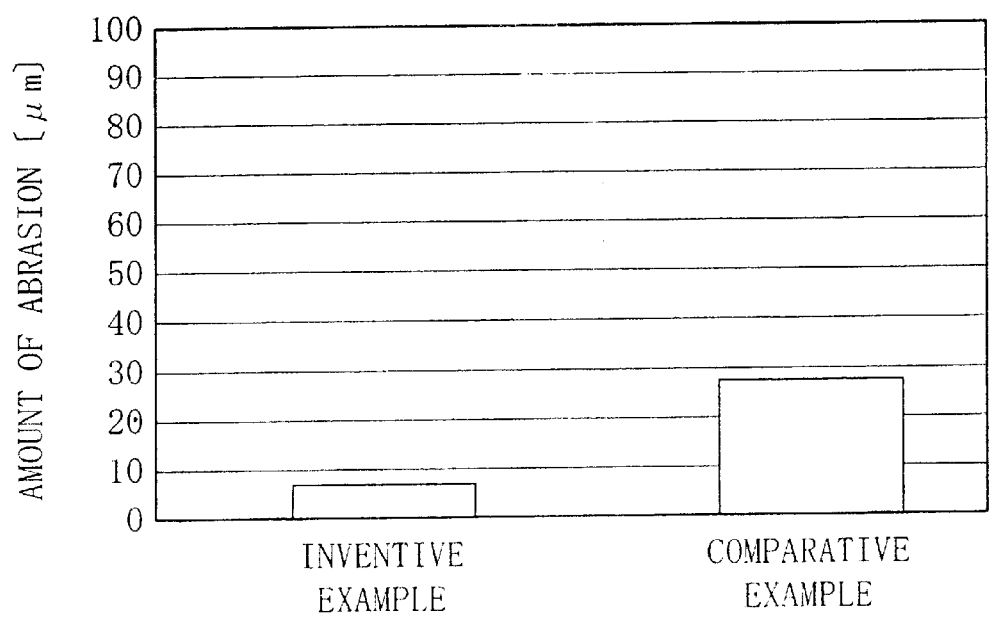
FIG. 8 is a plot showing examination results of an inventive example and a comparative example in Examination 1.

As can be seen from the plot of FIG. 8, the amount of abrasion of the inventive example is reduced approximately one-fourth of that of the comparative example.

Figure 9:
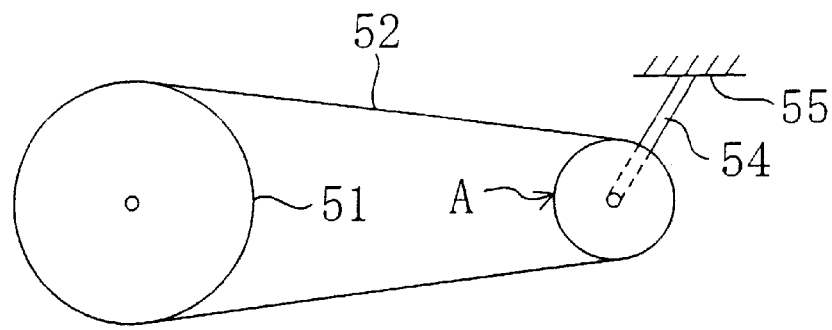
FIG. 9 is an explanatory diagram showing the layout of an abrasion test in which idling is performed in Examination 2.
Figure 10:
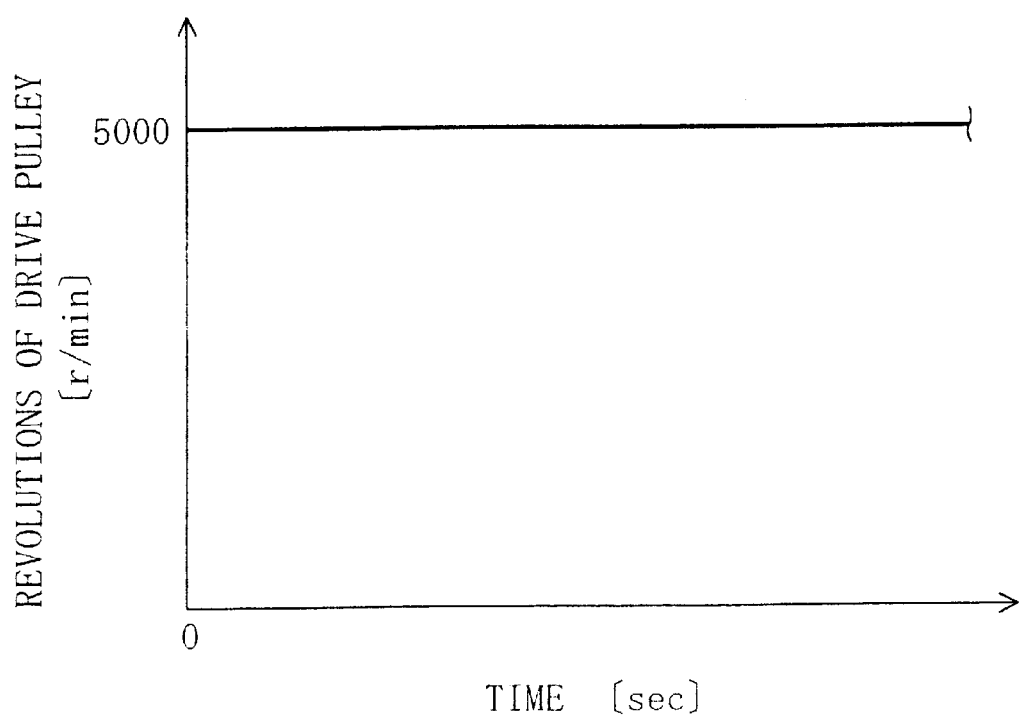
FIG. 10 is a plot showing operational conditions of a drive pulley in Examination 2.

Next, in Experiment 2, the one-way clutch-integrated pulley A as the inventive example was idled for a predetermined time period and the amount of abrasion (unit: $\mu$m) of each sprag was then measured. More specifically, as schematically shown in FIG. 9, the one-way clutch-integrated pulley A was set up in substantially the same arrangement as used in Experiment 1 but the inner ring of the one-way clutch-integrated pulley A was connected against rotation to the shaft member 54 fixed to a fixed body 55. In this arrangement, as shown in FIG. 10, the drive pulley 51 was rotated at a constant speed of 5000 rpm. Further, the same conventional one-way clutch-integrated pulley as used in Experiment 1 was prepared as a comparative example. The comparative example was also experimented in the same conditions as applied for the inventive example. The results of the experiment on both the examples are together shown in FIG. 11.

Figure 11:
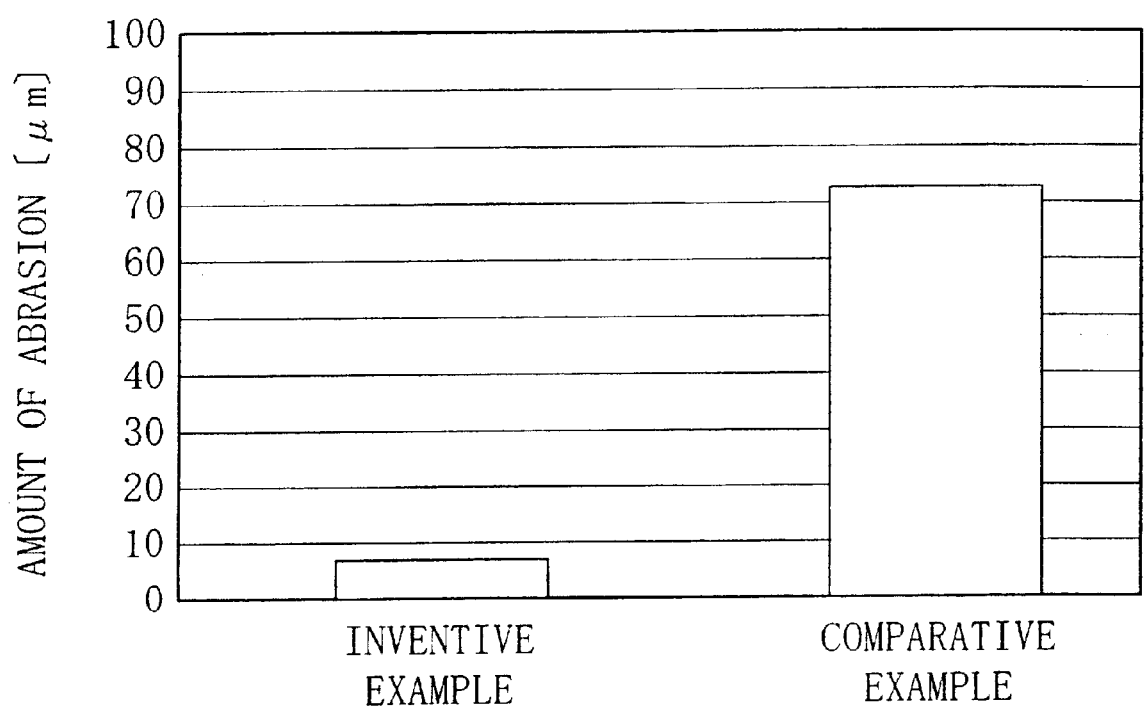
FIG. 11 is a plot showing examination results of an inventive example and a comparative example in Examination 2.

As can be seen from the plot of FIG. 11, the amount of abrasion of the inventive example is reduced approximately one-tenth of that of the comparative example.

(Embodiment 2)

Figure 12:
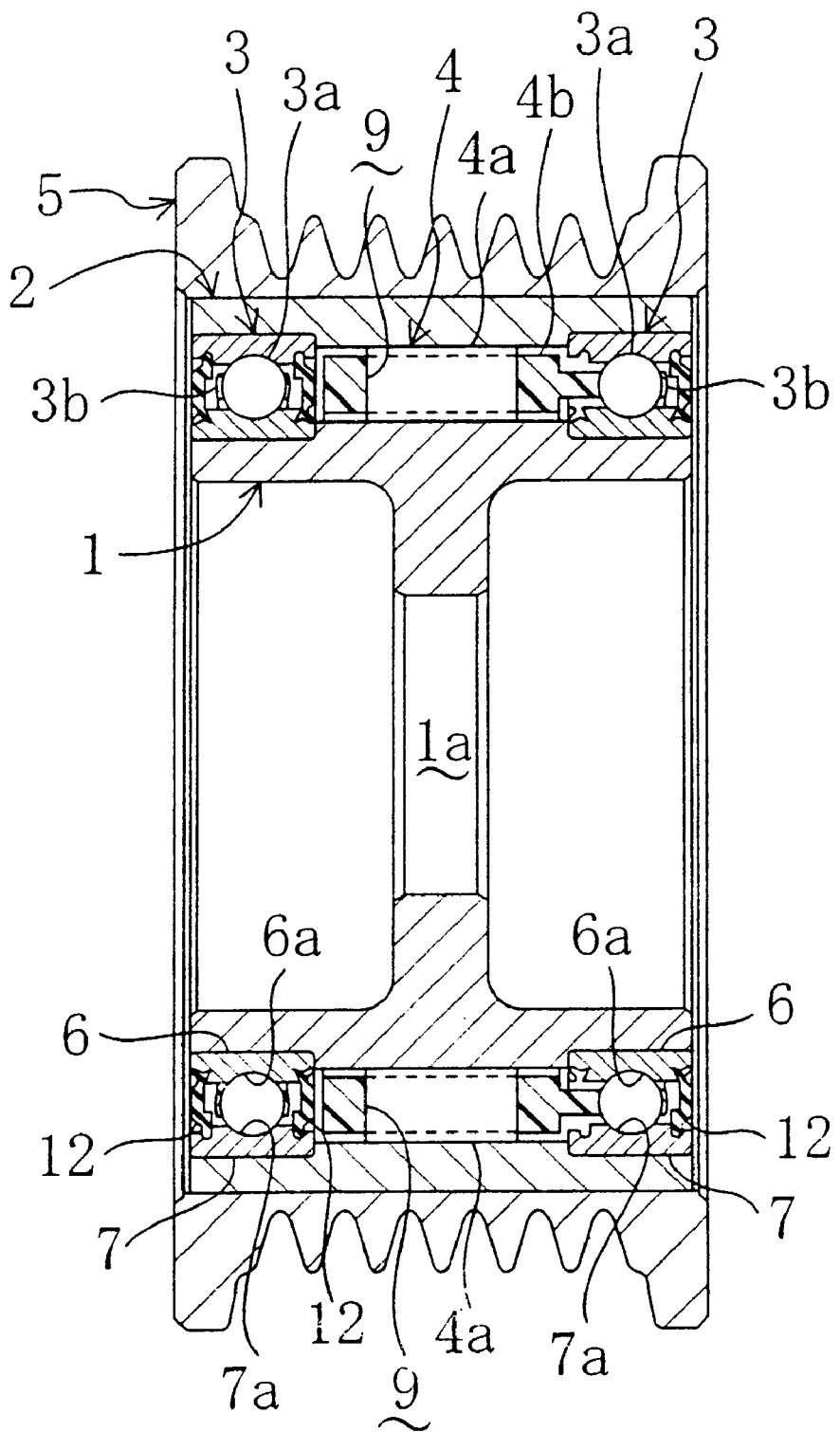
FIG. 12 is a longitudinal cross-sectional view showing the entire structure of a one-way clutch-integrated pulley according to Embodiment 2 of the present invention.
Figure 13:
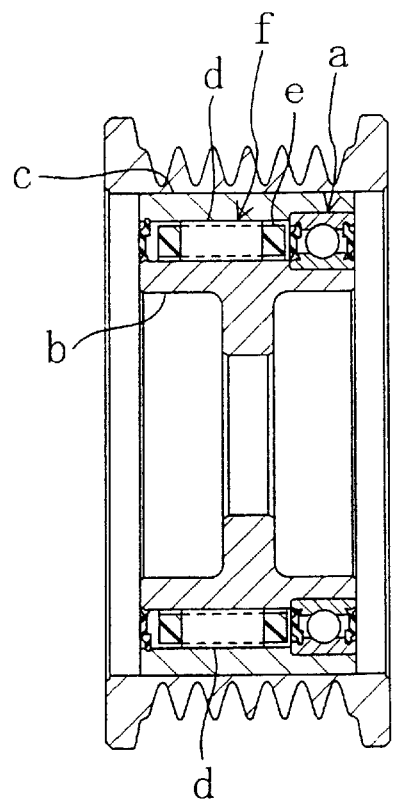
FIG. 13 is a view which shows the entire structure of a conventional one-way clutch-integrated pulley using a single row bearing and corresponds to FIG. 1.
Figure 14:
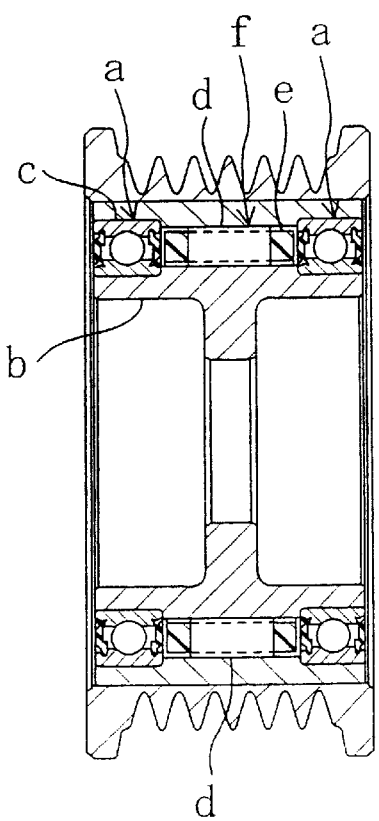
FIG. 14 is a view which shows the entire structure of a conventional one-way clutch-integrated pulley using a double row bearing and corresponds to FIG. 1.

FIG. 12 shows the entire structure of a one-way clutch-integrated pulley A according to Embodiment 2 of the present invention. This one-way clutch-integrated pulley A is also applied to a belt-driven auxiliary equipment driving apparatus for vehicle engines like Embodiment 1. Note that in the description made hereinafter about Embodiment 2, the same parts as in Embodiment 1 are identified by the same reference characters.

In this embodiment, unlike Embodiment 1, the widths of the inner and outer rings 1, 2 are increased to the extent slightly smaller than the width of the pulley section 5. A pair of deep groove ball bearings 3, 3 are provided, and two sets of steel balls 3a, 3a, . . . of the pair of bearings 3, 3 are arranged in different planes orthogonal to the rotational axis of the inner and outer rings 1, 2, respectively. In other words, both the deep groove ball bearings 3, 3 are arranged at both axial ends between the inner and outer rings 1, 2 so as to sandwich the clutch mechanism 4 between both the bearings 3, 3. In the deep groove ball bearing 3 on the right-hand side in FIG. 12, the seal 12 is disposed only on the axially right-hand side and a seal closer to the clutch mechanism 4 is dispensed with.

In addition, in this embodiment, the cage 4b of the clutch mechanism 4 is connected only to the cage 3b of the deep groove ball bearing 3 on the right-hand side in FIG. 12 (or may be connected only to the cage 3b of the deep groove ball bearing 3 on the left-hand side or to both the cages 3b, 3b). Other structures are the same as in Embodiment 1 and therefore the description thereof will be omitted. Thus, this embodiment can also attain the same effects and operations as obtained in Embodiment 1.

Though the bearing in Embodiments 1 and 2 is formed by a deep groove ball bearing 3 having steel balls 3a, 3a, . . . as rolling elements, other known bearings, such as a bearing having needle rollers as rolling members, may be used in the present invention.

Further, Embodiments 1 and 2 are directed to the one-way clutch-integrated pulley A in which the pulley section 5 is provided around the outer ring 2. However, the present invention is generally applicable to any type of one-way clutch.

Furthermore, in Embodiments 1 and 2, description is made about the one-way clutch using sprags 4a, 4a, . . . as cam members. However, the present invention is applicable for one-way clutches using cam members of various other shapes.

Moreover, Embodiments 1 and 2 are directed to the serpentine belt-driven type auxiliary equipment driving apparatus for use in the vehicle engine 20. However, the one-way clutch of the present invention is applicable to various types of other equipment.

What is claimed is:

1. A one-way clutch comprising:
   an inner ring;
   an outer ring which is coaxially disposed around the inner ring and relatively rotatably assembled with the inner ring;
   a bearing having a plurality of rolling elements arranged for rolling motion between-the inner and outer rings in a plane orthogonal to a rotational axis of the inner and outer rings and a cage, disposed between the inner and outer rings for rotation around the rotational axis of the inner and outer rings, for retaining the plurality of rolling elements between bearing surfaces in circumferentially spaced relationship around the rotational axis to allow their rolling motion, the bearing relatively rotatably supporting the inner and outer rings so that the plurality of rolling elements roll to rotate the cage in the same direction as that of relative rotation of the outer ring at a lower relative rotational speed than that of the outer ring; and
   a clutch mechanism having a plurality of independent cam members arranged for rocking motion between the inner and outer rings in a plane orthogonal to the rotational axis of the inner and outer rings but different from the plane in which the rolling elements of the bearing are arranged and a cage, disposed between the inner and outer rings for rotation around the rotational axis of the inner and outer rings, for retaining the plurality of cam members in retaining holes circumferentially spaced apart around the rotational axis to allow their rocking motion, the clutch mechanism effecting torque transmission between the inner and outer rings by tilting motion of the plurality of cam members in a direction to wedge between the inner and outer rings during relative rotation of the inner and outer rings in their locking direction and blocking the torque transmission by tilting motion of the plurality of cam members opposite to the direction to wedge between the inner and outer rings during relative rotation of the inner and outer rings in their unlocking direction; and wherein the cage of the clutch mechanism being connected in unitarily rotating relation with the cage of the bearing, and wherein the bearing surfaces of the bearing cage and the retaining holes of the clutch mechanism cage are independent of each other and are arranged so that each circumferentially spaced bearing surface is aligned with each circumferentially spaced apart retaining hole along the rotational axis of the inner and outer rings.

2. A one-way clutch comprising:

an inner ring;

an outer ring which is coaxially disposed around the inner ring and relatively rotatably assembled with the inner ring;

a pair of bearings having two sets of a plurality of rolling elements arranged for rolling motion between the inner and outer rings in different planes orthogonal to a rotational axis of the inner and outer rings and a pair of cages disposed between the inner and outer rings for rotation around the rotational axis of the inner and outer rings, for retaining the respective sets of rolling elements between bearing surfaces in circumferentially spaced relationship around the rotational axis to allow their rolling motion, the pair of bearings relatively rotatably supporting the inner and outer rings so that the two sets of rolling elements roll to rotate the respective cages in the same direction as that of relative rotation of the outer ring at a lower relative rotational speed than that of the outer ring; and a clutch mechanism having a plurality of independent cam members arranged for rocking motion between the inner and outer rings in a plane located between the pair of bearing and orthogonal to the rotational axis of the inner and outer rings and a cage, disposed between the inner and outer rings for rotation around the rotational axis of the inner and outer rings, for accommodating the plurality of cam members in retaining holes circumferentially spaced apart around the rotational axis and retaining them to allow their rocking motion, the clutch mechanism effecting torque transmission between the inner and outer rings by tilting motion of the plurality of cam members in a direction to wedge between the inner and outer rings during relative rotation of the inner and outer rings in their locking direction and blocking the torque transmission by tilting motion of the plurality of cam members opposite to the direction to wedge between the inner and outer rings during relative rotation of the inner and outer rings in their unlocking direction;

wherein the cage of the clutch mechanism being connected in unitarily rotating relation with the cage of at least one of the pair of bearings, and wherein the bearing surfaces of the bearing cage and the retaining holes of the clutch mechanism cage are independent of each other and are arranged so that each circumferentially spaced bearing surface of the unitarily rotating bearing is aligned with each circumferentially spaced apart retaining hole along the rotational axis of the inner and outer rings.

3. The one-way clutch of claim 1 or 2, wherein the one-way clutch is disposed in a torque transmission path for transmitting torque of a crank shaft rotating with slight variations in angular velocity resulting from an explosion stroke of a vehicle engine to an input shaft of auxiliary equipment through a power transmission belt.

4. The one-way clutch of claim 3, wherein the inner ring is connected to either the crank shaft of the vehicle engine or the input shaft of the auxiliary equipment, and the outer ring is provided in unitarily rotating relation with a pulley section for training the power transmission belt therearound.

* * * * *

UNITED STATES PATENT AND TRADEMARK OFFICE
CERTIFICATE OF CORRECTION

PATENT NO.    : 6,471,023 B2
DATED         : October 29, 2002
INVENTOR(S)   : Shuichi Nagaya, Hiroo Kiko and Masakazu Domoto It is certified that error appears in the above-identified patent and that said Letters Patent is hereby corrected as shown below:

<u>Column 10,</u>
Line 49, change "for rolling motion between-the inner and outer rings in" to -- for rolling motion between the inner and outer rings in --.

Signed and Sealed this

Eighth Day of April, 2003

JAMES E. ROGAN
*Director of the United States Patent and Trademark Office*